US008478440B2

(12) United States Patent
Edens

(10) Patent No.: US 8,478,440 B2

(45) Date of Patent: Jul. 2, 2013

(54) PRODUCTION OF MAIL PIECES AND PREPARATIONS THEREFOR

(75) Inventor: Bertus Karel Edens, Drachten (NL)

(73) Assignee: Neopost Industrie B.V., Drachten (NL)

( * ) Notice: Subject to any disclaimer, the term of this patent is extended or adjusted under 35 U.S.C. 154(b) by 551 days.

(21) Appl. No.: 11/783,746

(22) Filed: Apr. 11, 2007

(65) Prior Publication Data

US 2007/0250208 A1 Oct. 25, 2007

Related U.S. Application Data

(63) Continuation of application No. 10/032,104, filed on Dec. 31, 2001, now abandoned.

(30) Foreign Application Priority Data

Dec. 31, 2000 (NL) ..................................... 1017016

(51) Int. Cl.
*G06F 7/00* (2006.01)

(52) U.S. Cl.
USPC ........... 700/224; 700/223; 700/225; 700/226; 209/584; 209/900

(58) Field of Classification Search
USPC ... 700/219–227; 209/584, 900; 705/400–411; 382/101, 102
See application file for complete search history.

(56) References Cited

U.S. PATENT DOCUMENTS

| | | | | |
|---|---|---|---|---|
| 4,475,156 | A | 10/1984 | Federico et al. | |
| 4,734,865 | A | 3/1988 | Scullion et al. | |
| 4,985,013 | A | 1/1991 | Van der Werff et al. | |
| 5,067,088 | A | 11/1991 | Schneiderhan | |
| 5,362,037 | A | 11/1994 | Van der Werff et al. | |
| 5,570,280 | A | 10/1996 | Nunnally et al. | |
| 5,649,408 | A | 7/1997 | Mazeiller | |
| 5,956,414 | A | 9/1999 | Grueninger | |
| 6,032,122 | A | 2/2000 | Gertner et al. | |
| 6,119,051 | A | 9/2000 | Anderson, Jr. et al. | |
| 6,297,821 | B1 | 10/2001 | Baker et al. | |
| 6,311,104 | B1 | 10/2001 | Shea et al. | |
| 6,325,585 | B1 * | 12/2001 | Sasaki et al. | 412/11 |
| 6,327,515 | B1 | 12/2001 | Shea et al. | |

(Continued)

FOREIGN PATENT DOCUMENTS

| | | |
|---|---|---|
| EP | 0 661 176 | 7/1995 |
| EP | 0 768 625 | 4/1997 |
| EP | 0 781 671 | 7/1997 |
| WO | PCT/GB97/03354 | 6/1998 |

*Primary Examiner* — Jeffrey Shapiro
(74) *Attorney, Agent, or Firm* — Sughrue Mion, PLLC

(57) ABSTRACT

For producing mail pieces in a mail production apparatus, starting from physical postal items, a required operating condition of the mail production apparatus is determined. At least one physical property to be realized manually of the required operating condition is determined and at least one current physical property of a current condition of the mail production apparatus is registered. A difference between the at least one current physical property and the at least one physical property to be realized manually of said required operating condition is determined and an associated indication is represented in humanly perceptible form. In response, the at least one current physical property is changed, such that the difference is removed. Next, with the mail production apparatus in the required operating condition, at least one mail piece is assembled from physical postal items. Also described are computer software and an apparatus for use with this method.

25 Claims, 2 Drawing Sheets

U.S. PATENT DOCUMENTS

| | | | |
|---|---|---|---|
| 6,343,327 | B2 | 1/2002 | Daniels, Jr. et al. |
| 6,370,521 | B1 | 4/2002 | Pigos, Jr. et al. |
| 6,512,899 | B2 | 1/2003 | Shimada et al. |
| 6,575,358 | B2 | 6/2003 | O'Callaghan et al. |
| 6,581,097 | B1 | 6/2003 | Lynch et al. |
| 6,714,835 | B1 | 3/2004 | Hart, Jr. et al. |
| 6,732,011 | B1 | 5/2004 | Hart, Jr. et al. |
| 2001/0031150 | A1 | 10/2001 | Shimada et al. |

* cited by examiner

PRODUCTION OF MAIL PIECES AND PREPARATIONS THEREFOR

This application is a Continuation of application Ser. No. 10/032,104 filed on Dec. 31, 2001, now abandoned, and which claims priority of Application No. 1017016 filed Dec. 31, 2000 in the Netherlands.

FIELD AND BACKGROUND OF THE INVENTION

The invention relates to a method and an apparatus for producing mail pieces in a mail production apparatus, starting from physical postal items. The invention further relates to a computer program for programming an apparatus for practicing such a method.

Mail production apparatuses known from practice, of the Neopost SI-72 type, are arranged for indicating what paper lengths for producing mail pieces under a particular system setting need to be present in which feeder stations.

However, due to the mail producing apparatuses being frequently operated by temporary personnel with little experience, the problem occurs that during the preparations of the mail producing apparatus prior to the production of a mail piece or, as is more usual, a series of mail pieces under a predetermined system setting, problems arise in that the operator fails to see what needs to be done to bring the apparatus in the required condition of use, or makes mistakes.

SUMMARY OF THE INVENTION

The invention has for its object to provide a method whereby preparing a mail production apparatus is simplified and the chance of errors is reduced. To that end, the invention provides a method for producing mail pieces in a mail production apparatus, starting from physical postal items, comprising: selecting a required operating condition of the mail production apparatus applying to the production of at least one mail piece; determining at least one physical property to be realized manually of the required operating condition; registering at least one current physical property of a current condition of the mail production apparatus; determining a difference between the at least one current physical property and the at least one property to be realized manually of the required operating condition; representing an indication associated with the difference in a humanly perceptible form; manually changing the at least one current physical property, such that the difference is removed; and assembling the at least one mail piece from physical postal items with the mail production apparatus in the required operating condition.

As at least one physical property of the required operating condition that is to be manually realized is determined; at least one current physical property of a current condition of the mail production apparatus is registered; a difference between the at least one current physical property and the at least one, only manually realizable property of the required operating condition is determined; and an indication associated with the difference is represented in humanly perceptible form, the operator of the production apparatus does not himself need to determine the settings to be changed, but he can simply see what differences there are between the current condition of the apparatus and the required operating condition of the apparatus, or at least which actions are to be performed for bringing the mail production apparatus from the current condition into the required operating condition.

The invention further provides a computer program for supporting manual preparatory operations for operationalizing a mail production apparatus, comprising instructions for: determining data regarding a required operating condition applying to the production of at least one mail piece; determining at least one physical property to be realized manually of said required operating condition; registering at least one current physical property of a current condition of the mail production apparatus; determining a difference between the at least one current physical property and the at least one property to be realized manually of the required operating condition; and causing an indication associated with the difference to be represented in humanly perceptible form. In accordance with such a computer program, a mail production apparatus can be controlled for practicing the method according to the invention.

The invention further provides a mail production apparatus for producing mail pieces, starting from physical postal items, comprising: at least one finishing assembly for producing physical mail pieces; a sensor for registering a current physical property of a current condition of the at least one finishing assembly; representation means; and a control structure communicatively lined with the finishing assembly, the sensor and the representation means, the control structure being provided with code for: determining data regarding a required operating condition applying to the production of at least one mail piece; determining at least one physical property to be realized manually of the required operating condition; causing at least one current physical property of a current condition of the finishing assembly to be registered; determining a difference between the at least one current physical property and the at least one property to be realized manually of the required operating condition; causing an indication associated with the difference to be represented by the representation means; and causing the at least one mail piece to be composed by the finishing assembly in the operating condition. Such an apparatus is specifically arranged for practicing the method according to the invention.

Particularly advantageous embodiments of the invention are laid down in the depending claims.

Further details and aspects of the invention will be discussed with reference to the figures shown in the drawing.

DETAILED DESCRIPTION

In the following, the invention will be further elucidated on the basis of the example of an apparatus according to the invention shown in FIG. 1.

Figure 1:
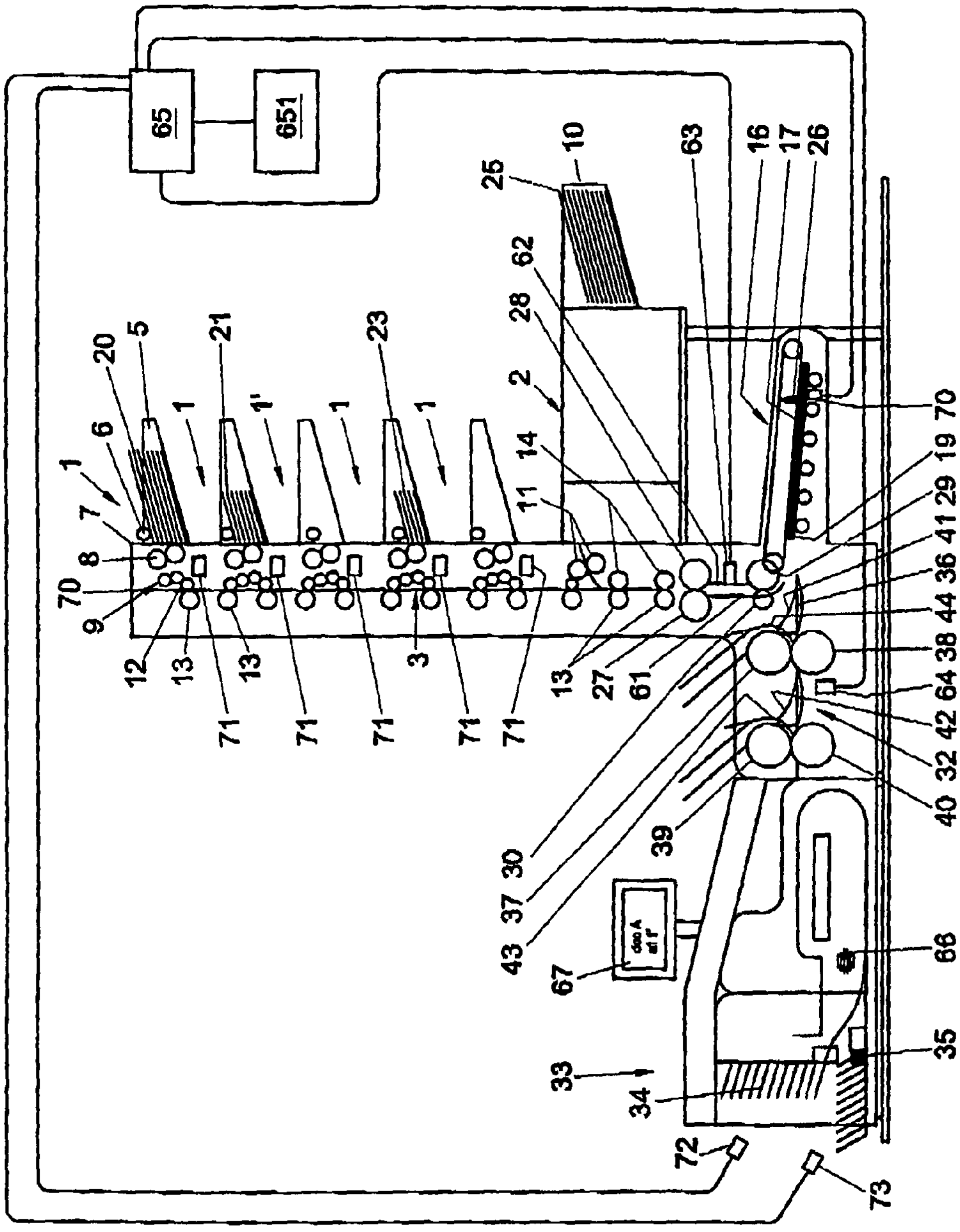
FIG. 1 is a cutaway schematic side elevation of a system according to an exemplary embodiment of the invention.

The apparatus shown in FIG. 1 has a finishing assembly for producing mail pieces. The finishing assembly is equipped with a number of feeder stations for feeding documents. In the apparatus, these are designed as document feeder stations 1 for feedings documents 20, 21, 23. The apparatus further comprises a printer 2 for printing sheets 25 and feeding printed sheets, and envelope feeder stations 34, 35 for feeding envelopes.

The first feeder stations 1 are designed as document feeder stations. Each of the document feeder stations 1 has an associated tray 5 for holding insert documents to be supplied. For feeding the inserts, the feeder stations 1 are each provided with a feed roller 6, a separation roller 7, a transport roller 8 and a pair of delivery rollers 9. An example of a separation provision suitable for use in feeder stations 1 according to the exemplary embodiment shown is described in more detail in U.S. Pat. No. 5,362,037, which is hereby referred to.

A position of the finishing assembly designated 1' is empty, apart from delivery rollers serving for feed-through of documents which are to be passed from upstream feeder stations along that position 1'. At this position 1', for instance the same feeder station as the feeder stations 1 can be placed, but also a special feeder station or a station for carrying out special operations, such as stamping passing documents or providing these with a sticker, a sachet or a plastic card.

The printer 2 is provided with a tray 10 for sheets 25 to be printed and a pair of delivery rollers 11 for each time delivering a printed sheet at a suitable moment. The printer 2 is further designed and positioned such that the printing of a sheet in each case is completed before the sheet reaches a waiting position between the delivery rollers 11.

The feeder stations 1 and the printer 2 link up with a feed track 3 having a series of opposite transport rollers 12, 13, 14.

The apparatus shown further comprises an aligning station 16 for aligning documents belonging to a set and any other postal items, to form a stack having document edges substantially in alignment on one side.

The aligning station 16 is designed as a terminal station with an aligning surface 19 with a stop 26 and a discharge track 36 in line with the aligning surface 19. Upstream of the aligning surface, the aligning station 16 has transport rollers 27, 28, 29, 30 and guides 61, 62. The aligning surface 19 is defined by a series of rollers.

The documents can be transported in the feeding direction as far as against the stop 26 and subsequently be discharged in the opposite direction to a folding station 32. The aligned document edges then form the trailing edge of the stack, which is advantageous in folding the stack.

Opposite the aligning surface 19, a conveyor belt 17 is arranged, which runs approximately parallel to the aligning surface 19, can exert some pressure on the aligning surface 19 and has a greater coefficient of friction relative to documents than does the aligning surface 19, which moreover is provided with rollers for further limiting the friction between documents and that surface. By driving the belt 17 in the direction of the stop 26, documents present between the aligning surface 19 and the belt 17 can be urged against the stop 26, so that the document edges are mutually aligned on the side of the stop 26.

By driving the conveyor belt 17, a document can be moved over the surface 19 as far as against the stop 26. A next document, which has been partly passed between the preceding document and the conveyor belt 17, will, moving over the preceding document, likewise move as far as against the stop 26 when the belt 17 is driven in the direction of the stop 26. Thus, successive documents can be aligned.

The folding station 32 is provided with a first and a second pair of folding rollers 37, 38 and 39, 40, with the discharge track 36 extending between the folding rollers 37, 38 and 39, 40. Provided between the stop 26 and the folding rollers 37, 38 and 39, 40, respectively, are deflectors 41 and 42 for deflecting the edge of a stack remote from the stop 26. Opposite a folding nip between each pair of folding rollers 37, 38 and 39, 40 is a folding knife 43, 44 for pressing a deflected portion of a document or a stack of documents into the folding nip.

After alignment of the documents of a stack in the aligning station 16, the stack is first moved against the feeding direction and then to the folding station 32, whereby, at least if the stack is to be folded, the edge of the stack remote from the stop 26, and a portion of the stack contiguous thereto, is deflected along a pair of folding rollers 37, 38 or 39, 40 and the stack is subsequently pressed into a folding nip between the folding rollers 37, 38 or 39, 40 by one of the folding knives 43, 44. Thereupon the folding rollers are driven, so that a fold is provided in the stack.

A folding station and folding method of the type as described hereinabove are described in more detail in U.S. Pat. No. 4,985,013, which is hereby referred to.

Connected to the folding station 32 is an inserter station 33. This inserter station 33 is equipped with two trays 34, 35 for envelopes. What can serve as a basis for such an inserter station is an inserter station described in more detail in the European patent application having publication no. 0781671. The inserter station has an envelope track 4 and an exit 18 for packaged mail pieces.

Figure 2:
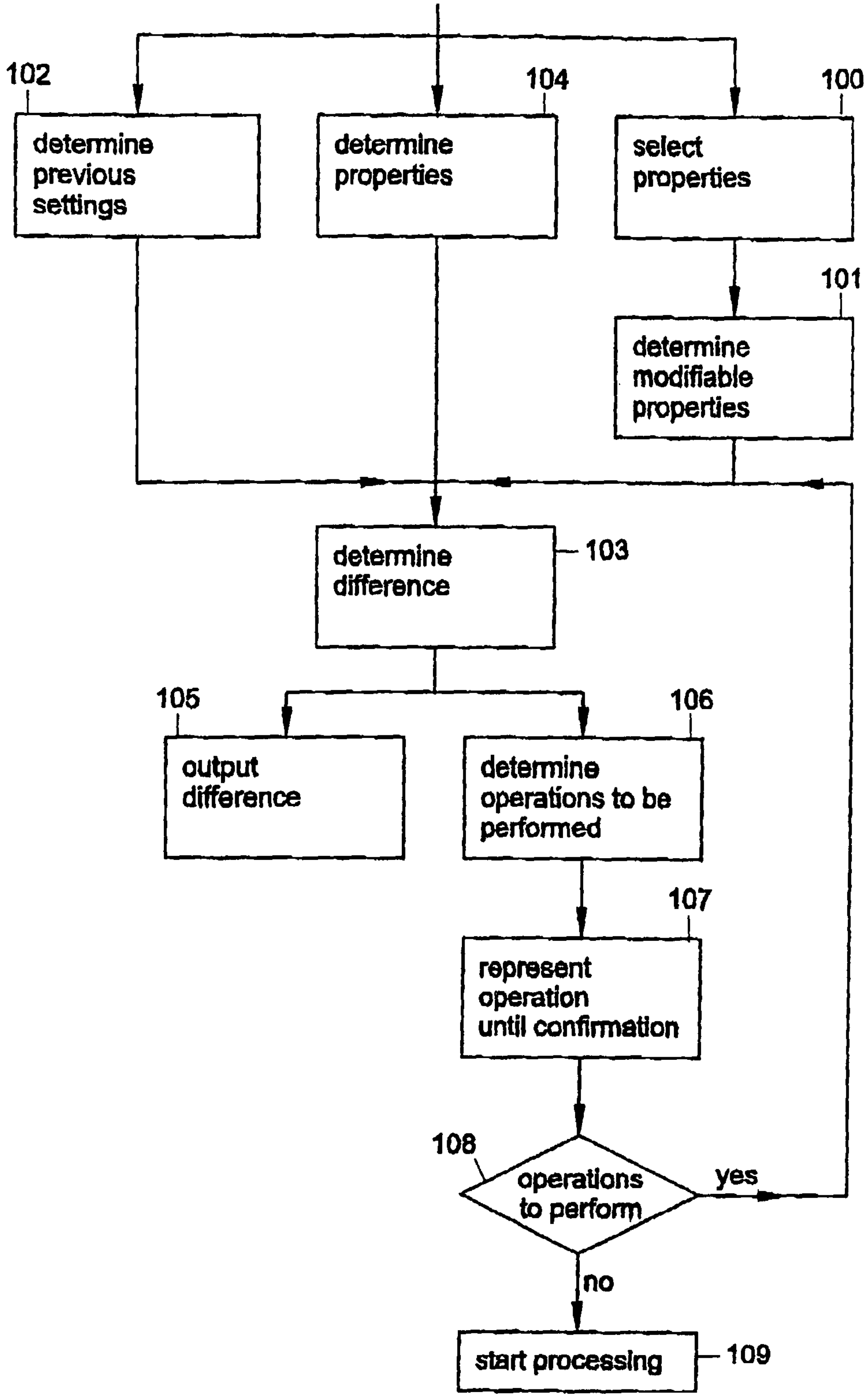
FIG. 2 is a flow diagram representing an example of a method according to the invention.

At the beginning of the setting and production operation represented in FIG. 2, first, in a setting phase, during a selection step 100, one or more properties of the finishing assembly are determined which are associated with the series of mail pieces to be produced. These can be, for instance: the inserts 20, 21, 23 needed for the mail pieces, and their positions, the required type of sheets 25 to be printed, required type(s) of envelopes, the number of required feeder stations, the settings of the folding station, the position of the stop 26, the presence of special stations at the position 1', the presence of a franking unit, etc.

The properties can have been priorly determined and subsequently stored in a memory 651 linked with a control unit 65 of the finishing assembly. At the start of the operation, a set of properties (also referred to as job setting) that apply to the production of a mail piece or, as is more usual, a series of mail pieces, is selected from the memory by a user. If the properties of the finishing assembly for the kind of mail piece to be produced have not been priorly determined, the properties can, after being inputted, be stored in the memory 651, so that in a next production operation of the same lid of mail pieces the data regarding the required set of properties can be readily retrieved again. Determining the properties of the finishing assembly that are desired for a series of mail pieces and inputting the data involved in the memory can be done by third person, not being an operator, for instance a technician of the manufacturer or a specially trained employee.

After a set of properties has been established, the control unit 65, in determining step 101, determines the physical properties thereof that are to be changed manually. It win be clear that automatically modifiable properties of the finishing assembly can be automatically modified under the control of the control unit 65. The properties to be modified manually, however, must be adapted by the operator. Automatically modifiable properties are known per se and are therefore not discussed for the sake of brevity. The properties to be changed manually can be, for instance: the types of document that must be present in the respective feeder stations 1, the presence of a particular type of station at the position 1' and downstream of the inserter machine 33, the size of the sheets 25 to be printed, the position of the stop 26 and the kind of envelopes that must be present in the envelope feeder stations 34, 35.

After determination step 101, the control unit 65, in step 103, determines the difference between the selected manually modifiable properties and current properties of a current condition of the finishing assembly. To that end, first, in step 104, the current properties of the current condition of the finishing assembly are registered. To that end, the apparatus is provided with sensors 63, 64, 70-73 linked with the control unit 65, which sensors can measure the quantities relevant for the respective property and, on the basis thereof, can provide signals that represent the respective properties to the control unit 65. As a result, the control unit 65 can determine the difference between the current condition and the required properties.

It is also possible, however, to determine the current properties relying on the set of properties that applied to the preceding production operation (step 102). The data regarding the set of properties that applied during the preceding production operation are stored in the memory 651 and can be retrieved therefrom by the control structure 65 and be compared with the properties determined. Determining the difference between the current condition and the required properties can thus also be done without actual observations, so that sensors can be saved.

For determining postal items present in the feeder stations 1 and sheets present in the printer 2, a scanner 63 is arranged along the transport track 3, downstream of the feeder stations 1 and the printer 2. The stations 1 and the printer are controlled one by one to feed an item, and these are scanned by the scanner 63. Thus, only one scanner can suffice for scanning items from all stations 1 and the printer 2. For observing envelope types in stations 84, 35, sensors 72, 73 are provided. In the embodiment shown in FIG. 1, the sensors 72, 73 are designed as digital cameras which can make a recording of the upper side of a stack of envelopes. The recording made by the cameras is then inputted into the control unit 65 and compared with images of postal item types as stored in the memory 651, so that the item type present can be determined and compared with the item type according to the required properties.

In FIG. 1, further sensors 71 in the form of connections with several electrical contact points are placed which can each detect the presence of a feeder station in the respective position and, on the basis of a signal received via the contact points, can further identify the type of feeder station. At the stop 26 a sensor 70 is present which detects the position of the stop, and the folding station is provided with a detector which can detect the position of deflectors 41, 42.

After in step 103 the difference between the required properties and the current properties has been determined, the difference determined is represented in representation step 105. Such representation can be done in any humanly perceptible form. According to this example, the difference is represented on a display 67. It is also possible, however, to provide the control structure 65 with a speech module and to communicate the difference to the operator by way of speech via a loudspeaker 66. Communication to the operator is then also possible without the operator being in the immediate vicinity of the display 67, which enables faster filling of the trays 5, 10, because the operator does not need to look at the display all the time. As the difference between the current condition and the properties to be changed is displayed, the operator can readily see what operations he must perform to bring the apparatus in the condition required for the mail piece to be produced. The operator thus does not himself need to determine the differences and the operations to be performed, but only needs to adjust the differences displayed, so that the risk of errors is reduced. As performing manual settings is thus simplified, also the necessity of automatic setting is rendered less urgent. As a consequence, without serious disadvantage, actuators for automatic setting can be saved upon.

The finishing assembly, depending on the setting of the finishing assembly selected by the operator, can also determine which operations are to be performed for removing the differences established in step 103 (step 106) and display the operations to be performed (step 107). A combination of representation step 105 and determining and representing the operations to be performed is also possible. In that case, for instance, the difference is depicted on a display in the form of an image of the apparatus with the differences highlighted and the operations to be performed represented in a table next to the image.

It is also possible in each case to represent only a portion of the operations to be performed in the step 107 and subsequently, in a step 108, to determine whether any further operations are to be performed and, if so, to represent a next one of residual operations. As a result, it is checked in each case whether the operator has performed the operation, or at least has reported it as performed, and the operator only needs to remember and perform the step represented.

The operator's chief actions are filling the feeder stations 1 and the envelope feeder stations 34, 35 with the correct postal item types, such as documents, inserts and envelope types. To prevent errors in this regard, in representing the operations to be performed, the item types to be loaded can be represented. To further reduce the risk of errors, also the feeder station where a specific document type is to be entered can be represented. Such representation can be effected, for instance, by depicting a property of the item type on the display 67. This property can be, for instance, the appearance of the front of the document, a title of the document, an identification code of the document, the size of the document or the kind of paper of the document.

After difference stop 103 and the representation step 105 and/or steps 106, 107 have been carried out, the current properties, as far as necessary, can be modified into the required properties, and with the production apparatus mail pieces can be produced with the system settings determined.

What is claimed is:

1. A computer program for bringing a mail production apparatus into a required operating condition prior to the production of a mail piece or a series of mail pieces, wherein data representing sets of properties associated with respective operating conditions of said apparatus required prior to initiation of the production in the respective operating condition are stored in a memory, at least one of said sets including at least one required physical property of the apparatus changeable only by manual implementation by an operator, other than by electronic data entry, the program comprising instructions for performing the following steps:

A) determining data representing at least one required physical property of a selected operating condition prior to initiation of the production;

B) registering at least one current physical property of said apparatus, prior to initiation of the production;

C) determining whether a manual change is to be made by comparing said at least one current physical property and said at least one required physical property of said selected operating condition, prior to initiation of the production;

D) in response to a manual change to be made, causing an instruction to make said manual change to be represented in humanly perceptible form, prior to initiation of the production, the instruction including information representing said at least one required physical property;

E) preventing said production from being initiated until said manual change has been made; and thereafter F) initiating said production after said manual change has been made.

2. The program according to claim 1, wherein the at least one current physical property of step C comprises a plurality of current physical properties.

3. The program according to claim 1, wherein the at least one current physical property of instruction B comprises a type of document needed to be present in a feeder station.

4. The program according to claim 1, wherein the at least one current physical property of instruction B comprises a particular type of station needed to be present.

5. The program according to claim 1, wherein the at least one current physical property of instruction B comprises the size of sheets to be printed.

6. The program according to claim 1, wherein the at least one current physical property of instruction B comprises the position of a stop.

7. The program according to claim 1, wherein the at least one current physical property of instruction B comprises the kind of envelopes that must be present in an envelope feeder station.

8. A mail production apparatus for producing mail pieces, starting from physical postal items, comprising:

at least one finishing assembly for producing physical mail pieces;

a sensor for registering a current physical property of a current operating condition of said at least one finishing assembly;

representation means; and a control structure communicatively linked with said finishing assembly, said sensor and said representation means, said control structure including a memory in which are stored sets of properties associated with respective operating conditions of the at least one finishing assembly required prior to initiation of the production in the respective operating condition, at least one of said sets including at least one required physical property of the at least one finishing assembly changeable only by manual implementation by an operator, other than by electronic data entry, for bringing the at least one finishing assembly in an operating condition, the control structure being provided with code for performing the following functions:

A) determining data representing at least one required physical property of a selected operating condition prior to initiation of the production;

B) causing said sensor to register at least one current physical property of the at least one finishing assembly, prior to initiation of the production;

C) determining whether a manual change is to be made by comparing said at least one current physical property and said at least one required physical property of said selected operating condition, prior to initiation of the production;

D) in response to a manual change to be made, causing said representation means to represent an instruction to make said manual change in humanly perceptible form, prior to initiation of the production, the instruction including information representing said at least one required physical property;

E) preventing said production from being initiated until said manual change has been made; and thereafter F) initiating said production after said manual change has been made.

9. The apparatus according to claim 8, wherein the at least one current physical property of function C comprises a plurality of current physical properties.

10. The apparatus according to claim 8, wherein the at least one current physical property of function B comprises a type of document needed to be present in a feeder station.

11. The apparatus according to claim 8, wherein the at least one current physical property of function B comprises a particular type of station needed to be present.

12. The apparatus according to claim 8, wherein the at least one current physical property of function B comprises the size of sheets to be printed.

13. The apparatus according to claim 8, wherein the at least one current physical property of function B comprises the position of a stop.

14. The apparatus according to claim 8, wherein the at least one current physical property of function B comprises the kind of envelopes that must be present in an envelope feeder station.

15. An information carrier provided with machine-readable data constituting a computer program according to claim 1.

16. An apparatus according to claim 8, further comprising a memory structure communicatively linked with said control structure for storing data which represent a directly preceding operating condition, wherein said control structure is further arranged for determining at least one property of said current condition by determining at least one property of said directly preceding operating condition.

17. An apparatus according to claim 8, wherein said control structure is further arranged for determining operations to be performed manually for bringing said finishing assembly from said current condition into said required operating condition and representing said operations to be performed with said representation means in humanly perceptible form.

18. An apparatus according to claim 17, wherein said control structure is further arranged for registering the current condition again after the performance of one of said operations to be performed and representing in humanly perceptible form at least one residual operation of said operations to be performed.

19. An apparatus according to claim 8, further comprising an item sensor communicatively linked with said control structure, for registering loaded physical postal items, wherein said control structure is further arranged for determining physical postal item types associated with said required operating condition, registering loaded physical postal items, determining at least one type of said loaded physical postal items; and representing at least one type of physical postal items to be loaded.

20. An apparatus according to claim 19, wherein said control structure is further arranged for representing, by said representation means, a loading position for physical postal items of that type to be loaded.

21. An apparatus according to claim 19, wherein said control structure is further arranged for representing a property of physical postal items of said type to be loaded.

22. An apparatus according to claim 19, wherein said item sensor is arranged for registering an item property of said loaded physical postal items.

23. The program according to claim 1, wherein registration of said at least one current physical property is performed by scanning at least a portion of at least one document to obtain a scanned image, the determination whether a manual change is to be made is performed by comparing said scanned image with a stored image containing said at least one required physical property, and if a difference between the scanned image and the stored image exceeds a predetermined threshold level, the stored image is displayed as said instruction.

24. The program according to claim 1, wherein said data representing at least one current physical property are data representing at least one required physical property for preparation of a preceding mail piece, and said determination of whether a manual change is to be made is performed by comparing said at least one required physical property with said at least one required physical property for the preparation of said preceding mail piece.

25. The program according to claim 1, wherein registration of said at least one current physical property is performed by scanning at least a portion of at least one document to obtain a scanned image, and the determination whether a manual change is to be made is performed by comparing said scanned image with a stored image containing said at least one required physical property.

* * * * *